(12) United States Patent
Kerner et al.

(10) Patent No.: US 8,027,123 B2
(45) Date of Patent: Sep. 27, 2011

(54) INTEGRATED WINDAGE BLOCKER FOR REDUCTION OF FLEX CABLE VIBRATION IN A DISK DRIVE

(75) Inventors: Jeffery Kerner, San Jose, CA (US); Jr-Yi Shen, Sunnyvale, CA (US); Jifang Tian, Fremont, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 950 days.

(21) Appl. No.: 12/004,743

(22) Filed: Dec. 19, 2007

(65) Prior Publication Data

US 2009/0161251 A1 Jun. 25, 2009

(51) Int. Cl.
G11B 33/04 (2006.01)

(52) U.S. Cl. .................................................. 360/97.02

(58) Field of Classification Search .............. 360/97.01, 360/97.02, 97.03, 97.04
See application file for complete search history.

(56) References Cited

U.S. PATENT DOCUMENTS

| | | | |
|---|---|---|---|
| 5,907,452 A | 5/1999 | Kan | |
| 5,999,303 A * | 12/1999 | Drake | 359/224.1 |
| 6,360,035 B1 * | 3/2002 | Hurst et al. | 385/18 |
| 6,661,603 B1 * | 12/2003 | Watkins et al. | 360/97.01 |
| 6,798,729 B1 * | 9/2004 | Hurst et al. | 369/119 |
| 6,930,856 B2 | 8/2005 | Wang et al. | |
| 7,046,486 B1 | 5/2006 | Coffey | |
| 7,057,851 B2 * | 6/2006 | Sun et al. | 360/97.02 |
| 7,136,261 B2 | 11/2006 | Bhattacharya et al. | |
| 7,511,925 B1 * | 3/2009 | Cuevas | 360/266 |
| 7,773,338 B2 * | 8/2010 | Hayakawa et al. | 360/97.02 |
| 7,872,836 B2 * | 1/2011 | Shindo et al. | 360/319 |
| 2002/0012279 A1 | 1/2002 | Angelo et al. | |
| 2004/0264058 A1 | 12/2004 | Huynh | |
| 2005/0157430 A1 | 7/2005 | Korkowski et al. | |
| 2005/0190502 A1 | 9/2005 | Sassine et al. | |
| 2006/0146446 A1 * | 7/2006 | Tran et al. | 360/235.1 |
| 2006/0146448 A1 * | 7/2006 | Tran et al. | 360/265.1 |
| 2008/0174910 A1 * | 7/2008 | Hirono et al. | 360/97.02 |
| 2008/0180835 A1 * | 7/2008 | Strom et al. | 360/97.02 |
| 2008/0310048 A1 * | 12/2008 | Hirono et al. | 360/97.02 |
| 2009/0086376 A1 * | 4/2009 | Chawanya et al. | 360/256.2 |
| 2009/0097163 A1 * | 4/2009 | Suzuki et al. | 360/245.8 |

OTHER PUBLICATIONS

Song, et al., "On the Improvement of Tracking Servo Performance of HDD Using Accelerometer", *IEEE Transactions Magazine*, (2004),1-2.

* cited by examiner

*Primary Examiner* — Allen Cao

(57) ABSTRACT

A windage blocker integrated with a base for a hard disk drive is disclosed. One embodiment provides a cavity portion comprising a planar surface defining an inner bottom surface of the cavity, the cavity portion for receiving an actuator assembly, the actuator assembly comprising a flex cable. The cavity includes at least one windage blocker integrated with the planar surface of the cavity of the base, the windage blocker for reducing detrimental local excitation of an airflow encountering the flex cable.

18 Claims, 3 Drawing Sheets

400

```
RECEIVING A FLEX CABLE AT AN ACTUATOR ASSEMBLY
COUPLED TO A BASE
402
```

```
PROVIDING AT LEAST ONE WINDAGE BLOCKER
INTEGRATED WITHIN THE BASE PROXIMATE THE ACTUATOR
ASSEMBLY TO REDUCE UNSTEADY AIRFLOW RELATED TO
AIRFLOW ENCOUNTERS WITH THE FLEX CABLE, THEREBY
REDUCING FLOW INDUCED VIBRATION OF AT LEAST A
PORTION OF THE ACTUATOR ASSEMBLY.
404
```

INTEGRATED WINDAGE BLOCKER FOR REDUCTION OF FLEX CABLE VIBRATION IN A DISK DRIVE

TECHNICAL FIELD

The present invention relates to the field of hard disk drive development, and more particularly to a method and system for an integrated windage blocker to reduce vibrations of a flex cable in a hard disk drive.

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable HDDs such as those used in personal digital assistants (PDAs), Moving Picture Experts Group audio layer 3 (MP3) players, and the like. For example, the original HDD had a disk diameter of 24 inches. Modem HDDs are much smaller and include disk diameters of less than 2.5 inches. Advances in magnetic recording are also primary reasons for the reduction in size.

A second refinement to the HDD is the increased efficiency and reduced size of the spindle motor spinning the disk. That is, as technology has reduced motor size and power draw for small motors, the mechanical portion of the HDD can be reduced and additional revolutions per minute (RPMs) can be achieved. For example, it is not uncommon for a HDD to reach speeds of 15,000 RPMs. This second refinement provides weight and size reductions to the HDD, it also provides a faster read and write rate for the disk thereby providing increased speed for accessing data. The increase in data acquisition speed due to the increased RPMs of the HDD and the more efficient read/write head portion provide modem computers with hard disk speed and storage capabilities that are continually increasing.

However, the higher RPMs of the disk have resulted in problems with respect to the interaction of the air with components of the HDD. For example, although the HDD is closed off from the outside, it has an amount of air within its packaging. As the disk spins and the RPMs increase, the air within the HDD package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk. That is, the linear velocity at the outer diameter of the disk.

Only when the Reynolds number is sufficiently small (e.g., an enclosure with reduced air density), the air may stay in steady flow with the boundary layer of air remaining smooth with respect to the rotating disk. However, any obstructions to the flow will result in turbulence.

As is well known from fluid dynamics, the characteristics of turbulent airflow can include buffeting, harmonic vibration, and the like. Each of these characteristics will result in problematic motion for the arm and head portion and/or the rotating disk. The problematic motion will result in excessive track miss-registration. This is even more significant as the tolerances are further reduced. In addition to track miss, turbulent airflow can induce vibrations that can damage components of the hard disk drive over time.

SUMMARY

A windage blocker integrated with a base for a hard disk drive is disclosed. One embodiment provides a cavity portion comprising a planar surface defining an inner bottom surface of the cavity, the cavity portion for receiving an actuator assembly, the actuator assembly comprising a flex cable. The cavity includes at least one windage blocker integrated with the planar surface of the cavity of the base, the windage blocker for reducing detrimental local excitation of an airflow encountering the flex cable.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a HDD and components connected therewith. The discussion will then focus on embodiments of a method and system for utilizing a disk drive case with an integrated windage blocker to re-direct airflow near a flex cable coupled to an actuator assembly to improve actuator dynamics, such as, flow induced vibration of a flex cable coupled to components of a head gimbal assembly in particular.

Overview

In general, the integrated windage blocker and base assembly effectively reduces non-repeatable runout (NRRO) and track-follow track misregistration (TMR) caused by unsteady airflow and at the same time reduces cost, manufacturing assembly time, and is more effective in suppressing flow induced vibration of the flex cable.

With spindle motor/disk packs rotating at 15 k RPM, flow induced vibrations are the major detractor to HDD performance. With newer slider designs (Femto) that have much smaller air-bearing surface, the flex cable coupled to the actuator assembly becomes an essential component in preventing head/disk damage from non-operational shocks.

Operation

Figure 1:
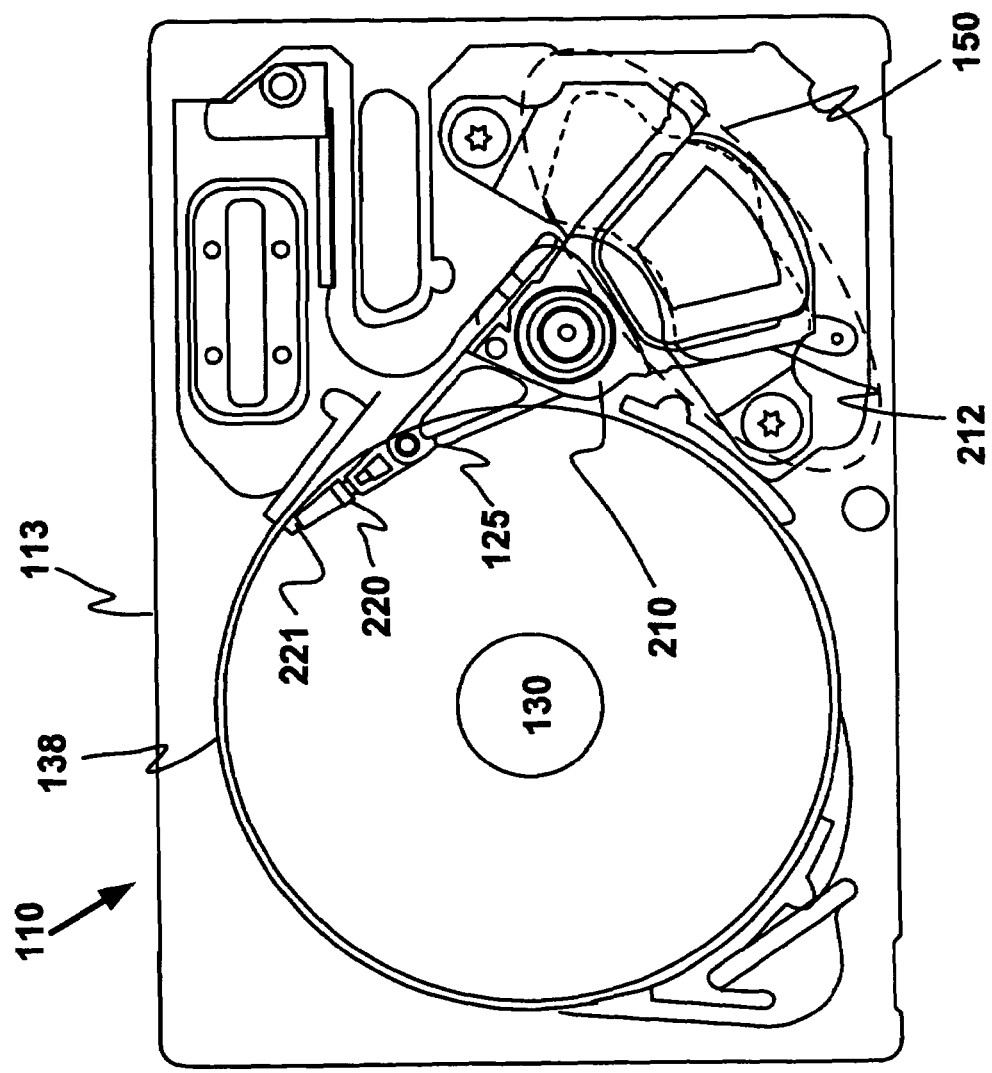
FIG. 1 is a plan view of a HDD in accordance with one embodiment of the present invention.

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 210. When a number of actuator arms 210 are present, they are usually represented in the form of a comb that is movably or pivotally mounted to base/housing 113. A controller 150 is also mounted to base 113 for selectively moving the actuator arms 210 relative to the disk 138. Actuator assembly 140 may be coupled with a connector assembly, such as a flex cable to convey data between arm electronics and a host system, such as a computer, wherein HDD 110 resides.

In one embodiment, each actuator arm 210 has extending from it at least one cantilevered integrated lead suspension (ILS) 224. The ILS 224 may be any form of lead suspension that can be used in a data access storage device. The level of integration containing the slider 221, ILS 224, and read/write head is called the Head Gimbal Assembly (HGA).

The ILS 224 has a spring-like quality, which biases or presses the air-bearing surface of slider 221 against disk 138 to cause slider 221 to fly at a precise distance from disk 138. ILS 224 has a hinge area that provides for the spring-like quality, and a flexing cable-type interconnect that supports read and write traces and electrical connections through the hinge area. Embodiments of the present invention use a windage blocker integrated into the housing 113 that blocks airflow turbulence around the flexible interconnect, thus improving disk drive performance. A voice coil 212, free to move within a conventional voice coil motor magnet assembly is also mounted to actuator arms 210 opposite the head gimbal assemblies. Movement of the actuator assembly 210 by controller 150 causes the head gimbal assembly to move along radial arcs across tracks on the surface of disk 138.

Figure 2:
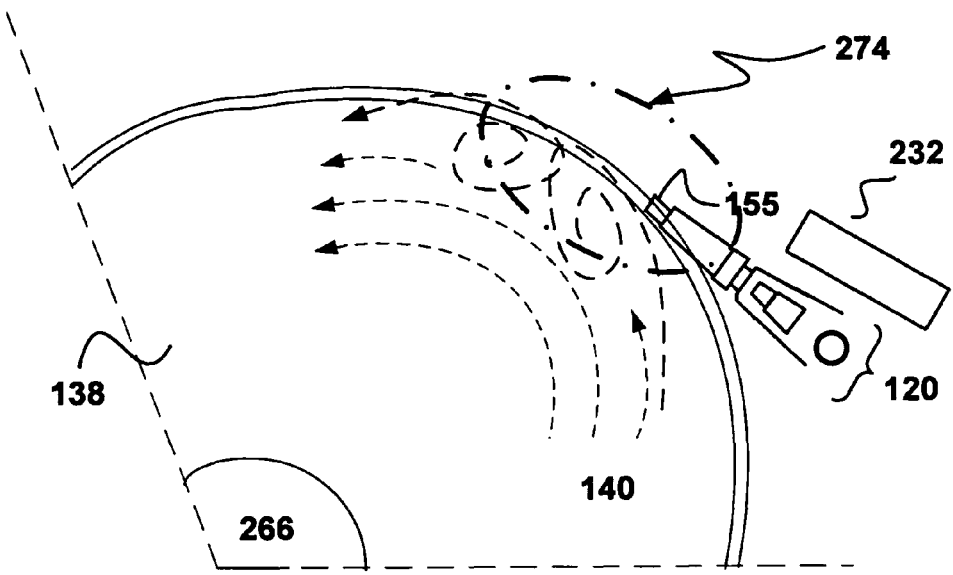
FIG. 2 is a block diagram illustrating airflow around a flex cable having no integrated spoiler is shown.

Referring now to FIG. 2, an airflow diagram 225 illustrating airflow around a flex cable assembly 232 having no windage blocker is shown. Airflow diagram 225 includes a portion of disk 138 and a portion of actuator assembly 120 including slider 155. In general, airflow diagram 225 illustrates one example of an airflow disruption area 274 caused by the airflow 140 encountering the flex cable 232. For example, airflow disruption area 274 may be a flow stagnation area that includes upstream and downstream vortices that exacerbate the flow induced vibration on the surrounding structures, including the head gimbal assemblies and flex cable 232.

These flow induced vibrations can cause random transient vibration (RTV) which is critical to the performance of high track per inch server class hard drives. Reduction of RTV would encourage better seek performance. In general, low frequency RTV comes from flex cable vibration at a few hundred Hertz. To reduce flex cable RTV, embodiments of the present invention reduce the excitation source by blocking the windage with a windage blocker integrated within the housing assembly. In one embodiment, the windage blocker is cast as an integrated part of the disk drive housing. The windage blocker of the present invention directs airflow around the flex cable, thus reducing flex cable vibration in the range of 400-500 Hz.

Figure 3:
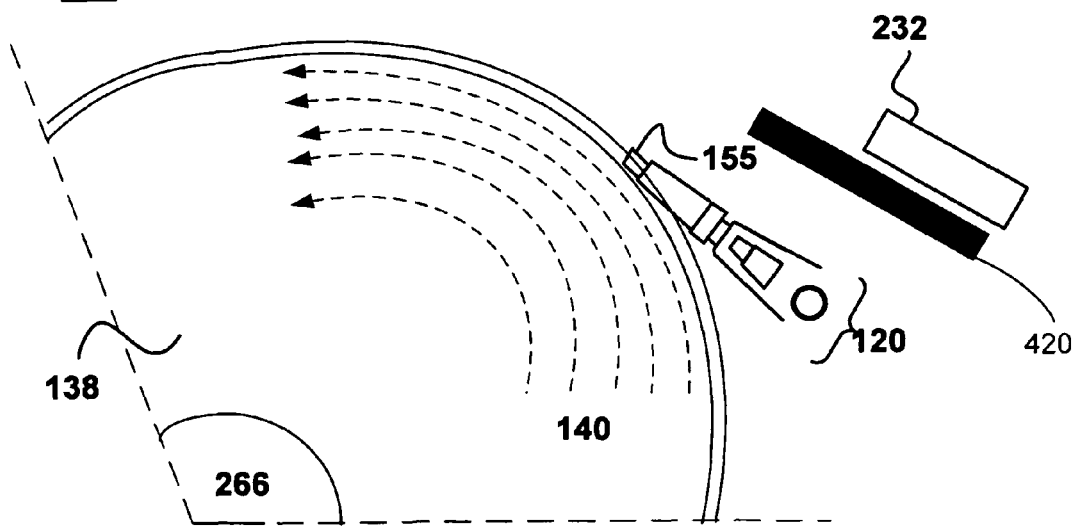
FIG. 3 is a block diagram illustrating airflow around a flex cable having a windage blocker integrated within the base assembly in accordance with one embodiment of the present invention.

With reference now to FIG. 3, airflow diagram 275 illustrating airflow around a flex cable 232 having at least one windage blocker 420 integrated within the base portion (not shown) in accordance with one embodiment of the present invention. In general, the windage blocker 420 integrated with the base assembly produces a zone of increased pressure and reduced velocity ahead of the flex cable 232. The increased pressure and reduced velocity suppress turbulent fluctuations near the flex cable coupled with the actuator suspension, which in turn reduces flow excited vibrations of the most flexible and turbulence-susceptible part of the actuator.

In one embodiment of the present invention, the windage blocker 420 is integrated with the base assembly. The windage blocker may be cast as a feature of the base assembly between the predetermined location of the actuator assembly and the predetermined location of the flex cable.

It is appreciated that the windage blocker 420 may be of any shape or size, depending on the desired airflow blockage. In one embodiment, the windage blocker may include an aerodynamically shaped leading edge with respect to the direction of the rotation of the disk. The windage blocker may also include a planar surface that is perpendicular to the bottom inside surface of the case assembly. The windage blocker may also be shaped in a form that corresponds to the arc generated by the motion of the actuator assembly.

Figure 4:
FIG. 4 is a flowchart of a method for utilizing a windage blocker integrated within the base assembly to reduce flex cable vibrations in a HDD in accordance with one embodiment of the present invention.

Referring now to FIG. 4, a flowchart of a method for reducing vibration of a flex cable using a windage blocker integrated in a base assembly is shown in accordance with one embodiment of the present invention. In general, the present technology reduces flow induced vibration of a flex cable coupled with an actuator assembly which reduces RTV of the flex cable, improving disk drive performance. Additionally, the windage blocker integrated with the base asembly reduces NRRO and track-follow TMR caused by unsteady airflow especially proximate the flex cable structure.

With reference now to 402 of FIG. 4, one embodiment receives a flex cable at an actuator assembly coupled to the base of the hard disk drive.

Referring now to 404 of FIG. 4, one embodiment provides at least one windage blocker integrated within the base proximate the actuator assembly to reduce unsteady airflow related to airflow encounters with the flex cable, thereby reducing flow induced vibration of at least a portion of the actuator assembly.

Thus, embodiments of the present invention provide a method and apparatus for utilizing a windage blocker integrated within the base assembly to improve actuator dynamics, such as, flow induced vibration of the flex cable in particular.

Moreover, the present embodiments provide significant airflow improvements while remaining within the already limiting constraints of HDD real estate. Moreover, the benefits described herein are realized with minimal modification to the overall HDD manufacturing process in general and to the base structure manufacturing process in particular reduces part cost and manufacturing assembly time since the windage blocker is manufactured as an integral part of the base assembly.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A base for a hard disk drive comprising:
a cavity portion comprising a planar surface defining an inner bottom surface of said cavity, said cavity portion for receiving an actuator assembly, said actuator assembly comprising a flex cable; and
at least one windage blocker integrated with said planar surface of said cavity of said base, said at least one windage blocker for reducing detrimental local excitation of an airflow encountering said flex cable wherein said windage blocker reduces vibrations of said flex cable in a frequency range of 400 Hz to 500 Hz.

2. The base for a hard disk drive of claim 1 wherein said airflow is generated by a rotating of a disk and said at least one windage blocker comprises an aerodynamically shaped leading edge with respect to a direction of rotation of said disk.

3. The base for a hard disk drive of claim 1 wherein said windage blocker comprises a planar surface that is perpendicular to said inner bottom surface of said cavity.

4. The base for a hard disk drive of claim 1 wherein a leading edge of said at least one windage blocker is formed in the shape of an arc generated by a motion of said actuator assembly.

5. The base for a hard disk drive of claim 1 wherein said windage blocker is disposed on said bottom surface of said cavity between a predetermined mounting location of said actuator assembly and a predetermined location of said flex cable.

6. The base for a hard disk drive of claim 1 wherein said windage blocker is cast within said cavity.

7. A hard disk drive comprising:
a housing comprising a cavity portion having a planar surface defining an inner bottom surface of said cavity,
a disk pack mounted to the cavity and having a plurality of disks that are rotatable relative to the housing, the disk pack defining an axis of rotation and a radial direction relative to the axis, wherein the rotating of said plurality of disks generates an airflow;
an actuator assembly mounted to the housing and being movable relative to the disk pack, the actuator assembly having a plurality of sliders thereon and a flex cable coupled thereto; and
at least one windage blocker integrated with said housing, said at least one windage blocker for reducing detrimental local excitation of said airflow encountering said flex cable.

8. The hard disk drive of claim 7 wherein said at least one windage blocker comprises an aerodynamically shaped leading edge with respect to said radial direction of said rotating of said disks.

9. The hard disk drive of claim 7 wherein said windage blocker comprises a planar surface that is perpendicular to said inner bottom surface of said cavity.

10. The hard disk drive of claim 7 wherein a leading edge of said at least one windage blocker is formed in the shape of an arc generated by a motion of said actuator assembly.

11. The hard disk drive of claim 7 wherein said windage blocker is formed as part of said bottom surface of said cavity at a location that is between said actuator assembly and said flex cable.

12. The hard disk drive of claim 7 wherein said windage blocker is cast within said cavity.

13. The hard disk drive of claim 7 wherein said windage blocker reduces vibrations of said flex cable in a frequency range of 400 Hz to 500 Hz.

14. A method for reducing flow induced vibration related to airflow encounters with a flex cable of a hard disk drive, said method comprising:
receiving a flex cable at an actuator assembly coupled to a base;
providing at least one windage blocker integrated within said base proximate said actuator assembly to reduce unsteady airflow related to airflow encounters with said flex cable, thereby reducing flow induced vibration of at least a portion of said actuator assembly; and
reducing vibrations of said flex cable in a frequency range of 400 Hz to 500 Hz by utilizing said windage blocker to reduce detrimental local excitation of an airflow encountering said flex cable.

15. The method as described in claim 14 further comprising:
casting said windage blocker as an integrated part of said base.

16. The method of claim 14 further comprising:
forming an aerodynamically shaped leading edge of said windage blocker with respect to a direction of rotation of a disk.

17. The method of claim 14 further comprising:
forming a planar surface of said windage blocker that is perpendicular to an inner bottom surface of said base.

18. The method of claim 14 further comprising:
forming said windage blocker in the shape of an arc generated by a motion of said actuator assembly.

* * * * *